US006422075B1

United States Patent
Foster et al.

(10) Patent No.: US 6,422,075 B1
(45) Date of Patent: Jul. 23, 2002

(54) LOW COST SENSOR PACKAGE FOR BEARING MOUNT

(75) Inventors: David A. Foster, Castalia; Steven E. Faetanini, Sandusky, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/766,747

(22) Filed: Jan. 22, 2001

(51) Int. Cl.[7] .............................. G01P 1/02; G01P 3/42; G01R 33/00
(52) U.S. Cl. .......................... 73/494; 324/160; 324/200
(58) Field of Search .................. 73/493, 494, 431; 264/272.11, 272.14, 272.15; 324/200, 207.15, 207.16, 207.2, 160, 166, 167, 168, 173, 174; 384/448

(56) References Cited

U.S. PATENT DOCUMENTS

| 5,140,261 A | | 8/1992 | Seo et al. ..................... 324/173 |
| 5,678,933 A | * | 10/1997 | Ouchi et al. ................. 384/448 |
| 5,814,984 A | * | 9/1998 | Ohmi et al. .................. 324/173 |
| 5,821,422 A | * | 10/1998 | Ouchi ....................... 73/514.39 |
| 5,861,744 A | | 1/1999 | Earl ............................ 324/166 |
| 5,922,953 A | * | 7/1999 | Payne et al. .................. 73/494 |
| 5,938,346 A | * | 8/1999 | Ouchi ........................ 384/448 |
| 5,967,669 A | * | 10/1999 | Ouchi ........................ 384/448 |
| 5,975,767 A | * | 11/1999 | Mizukoshi et al. ......... 384/544 |
| 6,122,263 A | | 9/2000 | Dahlin et al. ............... 370/329 |
| 6,209,389 B1 | * | 4/2001 | Sakamoto et al. ......... 73/118.1 |
| 6,218,827 B1 | * | 4/2001 | Ohmi et al. ................. 324/174 |

FOREIGN PATENT DOCUMENTS

| EP | 0783105 | 9/1997 |
| WO | WO01/11913 | 2/2001 |

OTHER PUBLICATIONS

US 5,602,235, 2/1997, Ouchi (withdrawn)*

* cited by examiner

*Primary Examiner*—Richard A. Moller
(74) *Attorney, Agent, or Firm*—Scott A. McBain

(57) ABSTRACT

A speed sensor for sensing a rotating speed of a wheel is provided. The speed sensor includes a thermoplastic sensor body. A mounting ring is connected to the sensor body. The mounting ring can include a flange portion. A plastic insert is integrally molded into the sensor body adjacent the mounting ring. An active sensor element is located in a lower end of the plastic insert, a face of the active sensor element being vertically spaced a predetermined distance from the flange portion. A pair of terminals is electrically connected to the active sensor element. The pair of terminals extends from an upper end of the plastic insert. The flange portion, when pressed onto a hub associated with the wheel, is adapted to space the active sensor element an operating distance from a tone wheel mounted to the hub.

20 Claims, 3 Drawing Sheets

LOW COST SENSOR PACKAGE FOR BEARING MOUNT

RELATED APPLICATIONS

This application claims the benefit of U.S. Provisional Application No. 60/222,350, filed Aug. 1, 2000, entitled Low Cost Sensor Package For Bearing Mounting by David A. Foster and Steven E. Faetanini.

TECHNICAL FIELD

The technical field of this disclosure is speed sensors for wheel bearing packages. In particular, a sensor cap is provided with an active sensor chip and associated elements into an integrated, sealed unit that accurately positions the sensor and protects the sensor from harsh conditions.

BACKGROUND OF THE INVENTION

Speed sensors are commonly included as an element in wheel bearing packages. Prior art sensors include passive sensors. Passive sensors provide a magnetic field with some type of magnet, generally combined in proximity with a sensing coil into a sensor component. The coil-magnet component is usually mounted fixed relative to the vehicle, since it has signal wires leaving it. A variable reluctance ring, generally a toothed iron ring, is mounted so as to turn at the speed of the wheel, within the magnetic field, thereby creating an electric signal that varies with wheel speed.

Passive sensors use wire coils and pole pieces combined with magnets to sense the moving sensor ring teeth. With regard to production of an integrated assembly, the prior sensors have presented some challenges. In particular, variable reluctance sensors include a large number of delicate parts that must be maintained in a connected state during packing in a housing. The fine wire coils and connections between components are particularly fragile. The coils and connections have been known to break easily during overmolding, as a result of thermal stress, during servicing and for other reasons.

It would be desirable to have a sensor system that would overcome the above disadvantages without involving extra steps and expense.

SUMMARY OF THE INVENTION

The present invention provides a sensor device and method of manufacturing for sensing a rotating a speed of a vehicle wheel. The device includes a sensor cap or body that mounts an active sensor element and the electrical terminations therefore into an integrated over-molded package with a minimum number of parts. The present invention utilizes a plastic holder, integrated into the cap, that positions the sensor and terminals. The cap includes an annular positioning ring. During molding the active sensor is positioned a predetermined distance with respect to a positioning flange on the positioning ring. When mounted to the hub of a bearing, the positioning ring provides a mounting interface that positions the sensor an operative distance to a sensor wheel.

An aspect of the present invention provides a speed sensor device including a cap portion with a flange portion and a sensor assembly with a body portion and a sensor. The body portion is integrally molded to an inner portion of the cap at a predetermined position to allow a portion of a hub including a tone wheel attached thereto to contact with the flange portion and position the sensor a predetermined distance from the tone wheel.

Other aspects of the invention provide a flange portion formed on an annular mounting ring formed in the cap portion. The body portion can include a lower portion adapted for maintaining the sensor in a predetermined location in the body portion. The lower portion can be a generally cylindrical portion with a locating tab formed thereon for engaging a corresponding groove in the sensor, the tab and groove positioned to maintain the sensor with respect to the body portion in the predetermined location. The lower portion can be a generally cylindrical portion with a locating flat side formed thereon for contacting a corresponding flat side of the sensor, positioned to maintain the sensor with respect to the body portion in the predetermined location.

Other aspects of the invention provide an upper portion of the body portion with a pair of terminals. The upper portion of the body portion can include a pair of retaining catches for retaining the pair of terminals. A capacitor can be electrically connected across the pair of terminals. The capacitor can be housed in a transverse slot located in the upper portion of the body, the transverse slot being located adjacent the pair of terminals. The sensor can be electrically connected to the pair of terminals. The predetermined distance between the sensor and the tone wheel can be about 0.050 inches.

Another aspect of the invention includes a method of manufacturing a speed sensor device including providing a sensor assembly including an insert body, a sensor located in a lower portion of the insert body, a pair of terminals located in an upper portion of the insert body electrically connected to the sensor. A mounting ring can be provided with a locating flange. The sensor assembly and mounting ring can be thermoformed into a cap portion.

Other aspects of the present invention include locating the sensor assembly at a predetermined position in the cap portion. The lower portion of the insert body can include a tooth and the sensor can include a groove, the tooth and groove cooperating to secure the sensor in the predetermined position in the cap portion. The lower portion of the insert body can include a flat surface and the sensor includes a flat portion, the flat surface and the flat portion cooperating to maintain the sensor in the predetermined position in the cap portion. The pair of terminals can be are secured in a pair of retaining catches formed in the upper portion of the insert body. The method can include providing a capacitor electrically connected to the pair of terminals before thermoforming the sensor assembly into the cap portion. The capacitor can be positioned in a slot formed in the upper portion of the insert body. The sensor assembly can be located at the predetermined position in the cap portion by locating the sensor assembly relative to a position of the flange portion.

Another aspect of the present invention provides a speed sensor device for sensing a rotating speed of a vehicle wheel including a thermoplastic sensor body, a mounting ring formed in the sensor body, the mounting ring including a flange portion, a plastic insert integrally molded into the sensor body adjacent the mounting ring, an active sensor element located in a lower end of the plastic insert, a face of the active sensor element being vertically spaced by the lower end of the plastic insert a predetermined distance from the flange portion and a pair of terminals electrically connected to the active sensor element, the pair of terminals extending from an upper end of the plastic insert, wherein the flange portion, when located on a hub associated with the wheel, is adapted to space the active sensor element an operable distance from a tone wheel mounted to the hub.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Figure 1:
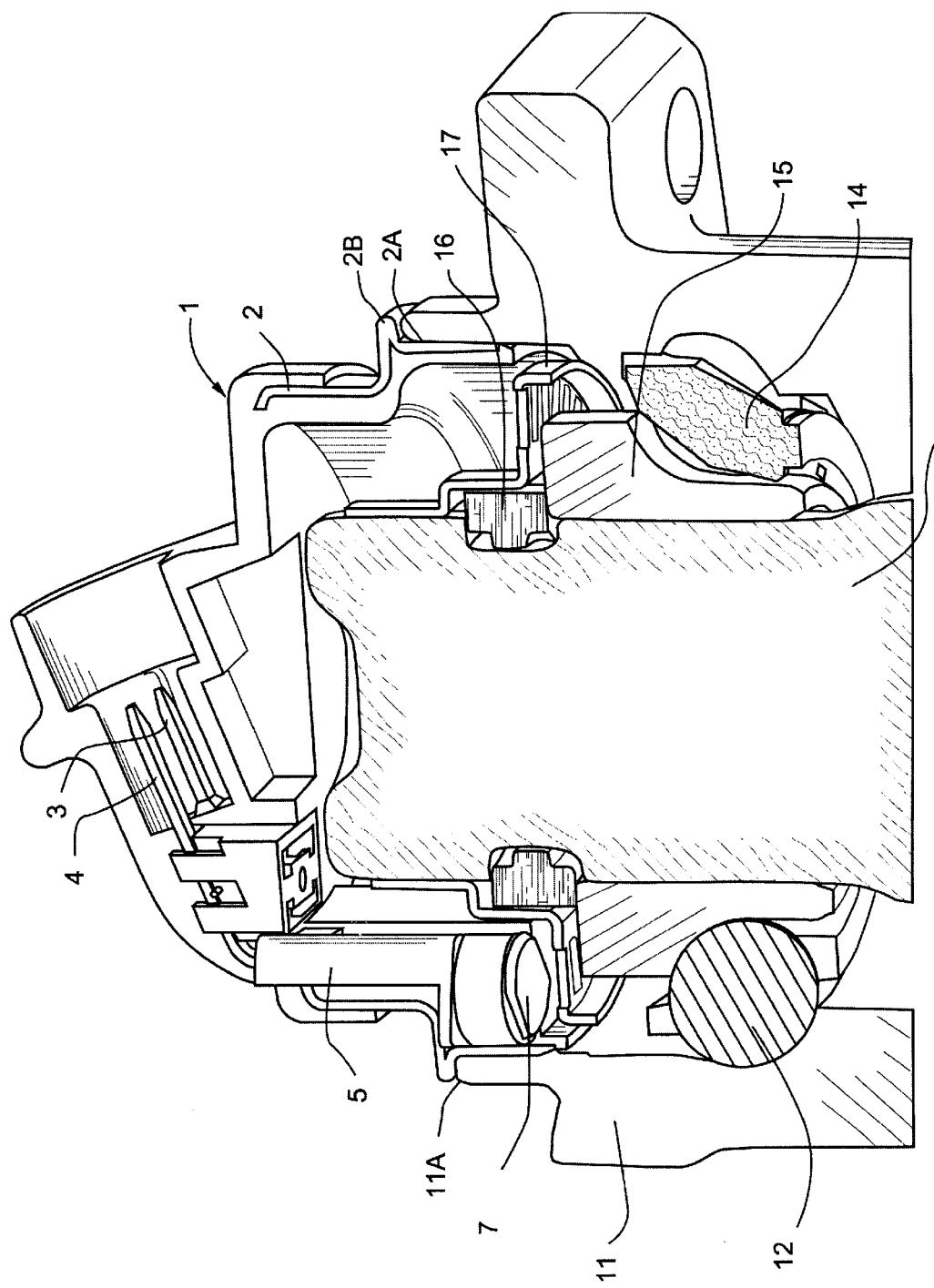
FIG. 1 shows an embodiment of the sensor package located adjacent a wheel bearing.

Referring to FIG. 1, a section view of the sensor package located on a wheel bearing is shown. The sensor package can include a thermoplastic body 1 including a metal mounting ring 2. A pair of connector terminals 3, 4 may be located in an upper portion of the body 1. A plastic insert 5 can receive the terminals 3, 4 in an upper portion. Opposite the upper end of the plastic insert 5, the active sensor package or element 7, can be received in a lower end of the plastic insert. The active sensor is a sensor that includes a solid-state chip for sensing changes in a magnetic field. Examples of active sensors include Hall effect sensors, MR sensors and the like.

An optional capacitor (shown in FIG. 2) can be located in a slot in the upper end of the plastic insert 5 adjacent the terminals 3, 4. The capacitor is bridged across the terminals 3, 4.

The bearing assembly can include a hub 11, multiple rolling elements 12, a spindle 13, two separators 14, an inner ring 15, two C-keepers 16, and a sensor ring 17. The sensor ring 17 may be a metallic piece with teeth or a flat surface with areas effecting magnetic field concentration variances or the like, as long as it is capable of producing magnetic field variances detectable by the sensor 7. The sensor package can be mated to the bearing hub 11 by a press fit with the pilot diameter 2A of the metal ring 2. This can be a steel interface for leak prevention and for maximum retention of the sensor package to the bearing. The flange 2B of the metal mounting ring 2 can be pressed against the bearing hub 11 end face 11A and acts as a positive stop of the location of the sensor assembly. This insures the correct relative position of the active sensor element 7 to the sensor ring 17. In this manner, the air gap or sensor gap is carefully maintained between the sensor element 7 and the sensor ring 17. The gap or operating distance between the tone wheel or sensor ring 17 and the sensor element is usually less than 0.050 inches. Since the active sensor 7 is position-sensitive, this resulting gap is an important aspect of the invention.

Figure 2:
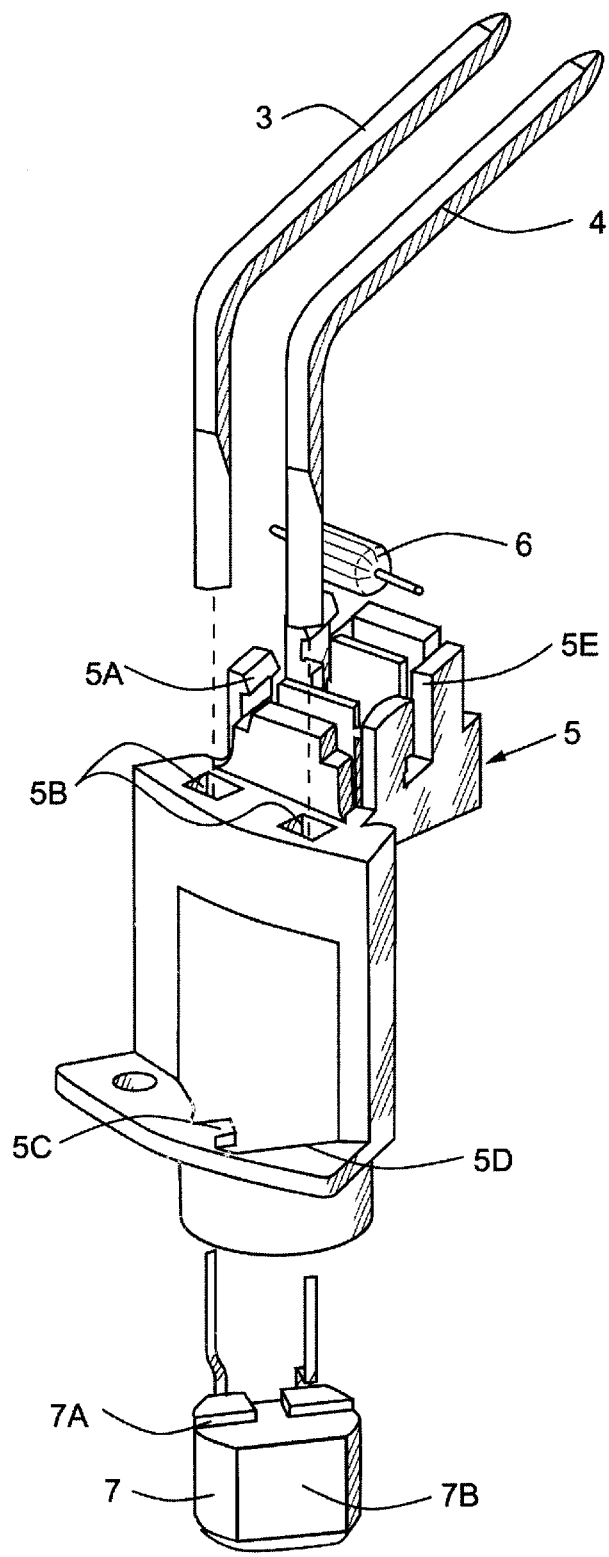
FIG. 2 shows an embodiment of the sensor components.

Referring to FIG. 2, the components that are assembled into the plastic insert 5 are shown. These components include the connection terminals 3, 4, the capacitor 6 and the active sensor element package 7. The plastic insert 5 contains unique features to locate the sensor element package and the two terminals. Two features on the plastic insert locate the sensor element package. A small tab 5C provides a positive stop of the slot 7A on the top of the sensor element package. Additionally, the flat 7B on the sensor element package aligns with the flat 5D on the plastic insert. This orientation feature optimizes the sensor performance for a given sensor ring geometry. A pocket or slot 5E in the plastic insert provides the locating feature for the capacitor 6. The terminals 3, 4 are retained in the plastic inset by the snap feature 5A.

The components of the insert assembly are assembled as follows. First, the capacitor 6 is placed into the pocket 5E of the plastic insert 5. Next, the two terminals 3, 4 are inserted through the holes 5B in the plastic insert 5 and snapped into the snap retention features 5A of the plastic insert. The sensor package 7 is then inserted into the bottom of the plastic insert 5 and oriented according to features 5C, 5D. The leads of the sensor element package and the capacitor can be resistance welded to the terminals or attached and electrically connected by any appropriate known method. The advantage of the present arrangement includes the relatively robust connection between the terminals 3, 4 and sensor 7, which is not possible with the fine wire coils of the prior art. Additional holes in the plastic insert can be used to locate the insert assembly in the mold.

Figure 3:
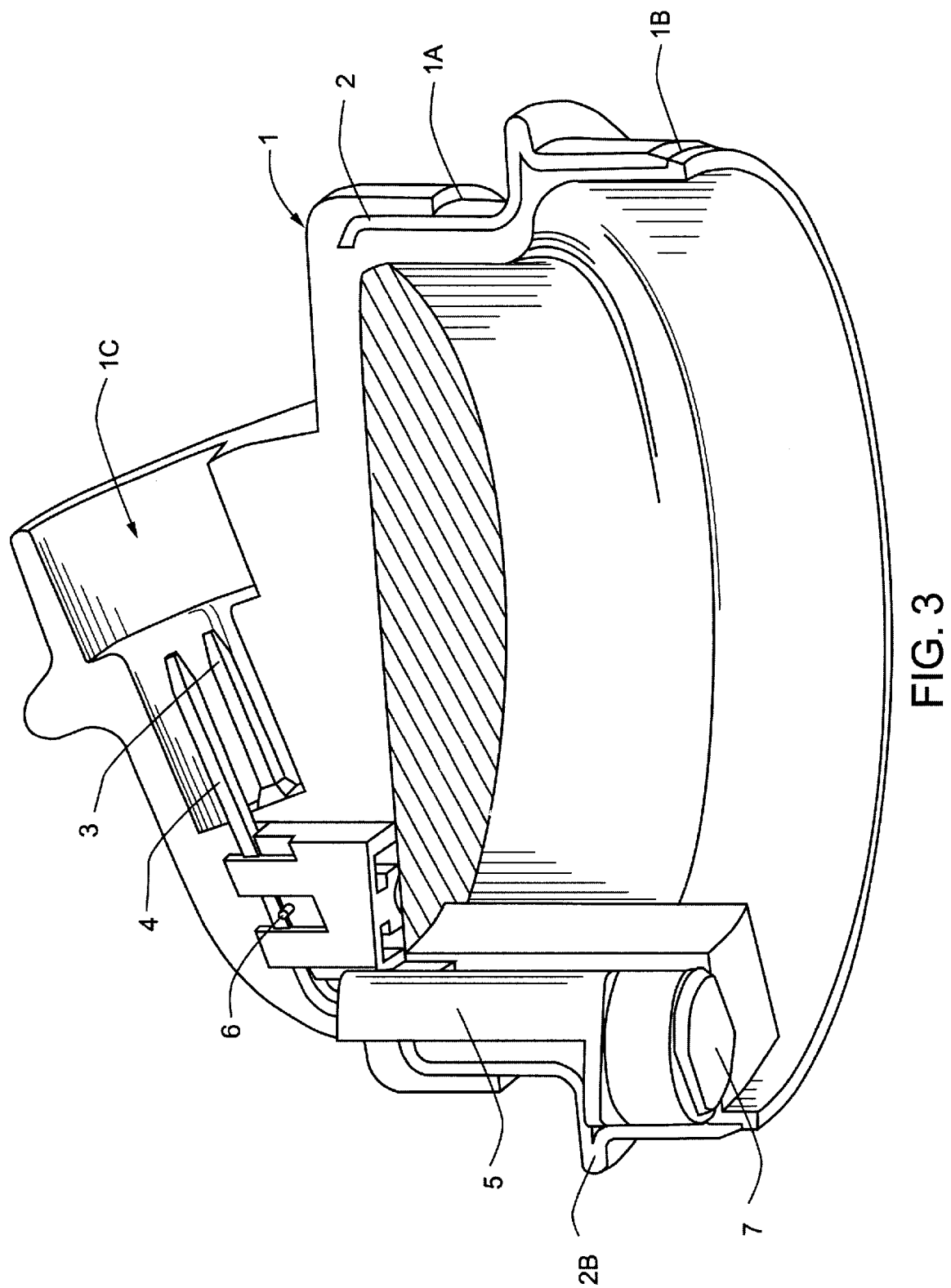
FIG. 3 shows an embodiment of the sensor cap.

FIG. 3 illustrates a sectional view of the finished sensor cap. The thermoplastic sensor body 1 encapsulates the sensor components and forms the connector cavity 1C. The plastic insert 5 contains the connector terminals 3, 4, the active sensor element package 7, and the capacitor 6. The assembled insert and the metal mounting ring 2 are located in the lower portion of the mold such that the active sensor 7 is located at a predetermined location relative to the flange 2B adjacent the metal ring 2. This method of locating the sensor precisely locates the sensor 7 with respect to the tone wheel or sensor ring 17 after assembly of the sensor cap body 1 to the wheel bearing assembly.

During the molding process, the lower portion of the mold has pins that locate in the holes of the insert assembly to keep the insert assembly stationary. The lower portion of the mold also has a feature that locates the flange 2B of the metal ring 2. The lower portion of the mold also provides the shape for the interior of the sensor cap. The right and left sides of the mold provide the shape of the outside of the sensor cap. Another mold insert provides the shape of the connector cavity 1C. The two mold halves are closed and the thermoplastic for body 1 is injected into the mold. A finished part is removed from the mold when the molding process is complete. The thermoplastic material is cut off on the outside of the metal ring portion 1A and on the bottom face of the metal ring portion 1B. The thermoplastic material seals the sensor cavity from the outside environment. The length of the potential leak path of contaminants from the outside of the sensor cap into the interior of the sensor/bearing cavity is maximized by the length of the thermoplastic material 1 that surrounds the metal mounting ring 2.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed:

1. A speed sensor device comprising:
   a cap portion including a flange portion;
   a sensor assembly including a body portion and a sensor, the body portion integrally molded to an inner portion of the cap at a predetermined position to allow a portion of a hub including a tone wheel attached thereto to contact with the flange portion and position the sensor a predetermined distance from the tone wheel.

2. The speed sensor device of claim 1 wherein the flange portion is formed on an annular mounting ring formed in the cap portion.

3. The speed sensor device of claim 1 wherein the body portion includes a lower portion adapted for maintaining the sensor in a predetermined location in the body portion.

4. The speed sensor device of claim 3 wherein the lower portion is a generally cylindrical portion with a locating tab formed thereon for engaging a corresponding groove in the sensor, the tab and groove positioned to maintain the sensor with respect to the body portion in the predetermined location.

5. The speed sensor device of claim 3 wherein the lower portion is a generally cylindrical portion with a locating flat side formed thereon for contacting a corresponding flat side of the sensor, positioned to maintain the sensor with respect to the body portion in the predetermined location.

6. The speed sensor device of claim 3 wherein an upper portion of the body portion includes a pair of terminals.

7. The speed sensor device of claim 6 wherein the upper portion of the body portion includes a pair of retaining catches for retaining the pair of terminals.

8. The speed sensor device of claim 6 wherein a capacitor is electrically connected across the pair of terminals.

9. The speed sensor device of claim 8 wherein the capacitor is housed in a transverse slot located in the upper portion of the body, the transverse slot being located adjacent the pair of terminals.

10. The speed sensor device of claim 6 wherein the sensor is electrically connected to the pair of terminals.

11. The speed sensor device of claim 1 wherein the predetermined distance is about 0.050 inches.

12. A method of manufacturing a speed sensor device comprising:

provoiding an sensor assembly including an insert body, a sensor located in a lower portion of the insert body, a pair of terminals located in an upper portion of the insert body electrically connected to the sensor;

providing a mounting ring with a locating flange;

thermoforming the sensor assembly and mounting ring into a cap portion.

13. The method of claim 12 wherein the sensor assembly is located at a predetermined position in the cap portion.

14. The method of claim 13 wherein the lower portion of the insert body includes a tooth and the sensor includes a groove, the tooth and groove cooperating to secure the sensor in the predetermined position in the cap portion.

15. The method of claim 12 wherein the lower portion of the insert body includes a flat surface and the sensor includes a flat portion, the flat surface and the flat portion cooperating to maintain the sensor in the predetermined position in the cap portion.

16. The method of claim 12 wherein the pair of terminals are secured in a pair of retaining catches formed in the upper portion of the insert body.

17. The method of claim 12 further comprising:

providing a capacitor electrically connected to the pair of terminals before thermoforming the sensor assembly into the cap portion.

18. The method of claim 17 wherein the capacitor is positioned in a slot formed in the upper portion of the insert body.

19. The method of claim 12 wherein the sensor assembly is located at the predetermined position in the cap portion by locating the sensor assembly relative to a position of the flange portion.

20. A speed sensor device for sensing a rotating speed of a vehicle wheel comprising:

a thermoplastic sensor body;

a mounting ring formed in the sensor body, the mounting ring including a flange portion;

a plastic insert integrally molded into the sensor body adjacent the mounting ring;

an active sensor element located in a lower end of the plastic insert, a face of the active sensor element being vertically spaced by the lower end of the plastic insert a predetermined distance from the flange portion; and a pair of terminals electrically connected to the active sensor element, the pair of terminals extending from an upper end of the plastic insert, wherein the flange portion, when located on a hub associated with the wheel, is adapted to space the active sensor element an operable distance from a tone wheel mounted to the hub.

\* \* \* \* \*